May 16, 1967 M. A. BERK 3,319,405
AGRICULTURAL IMPLEMENT
Filed June 5, 1964 5 Sheets-Sheet 1

INVENTOR.
M. A. BERK

BY William A. Murray

ATTORNEY

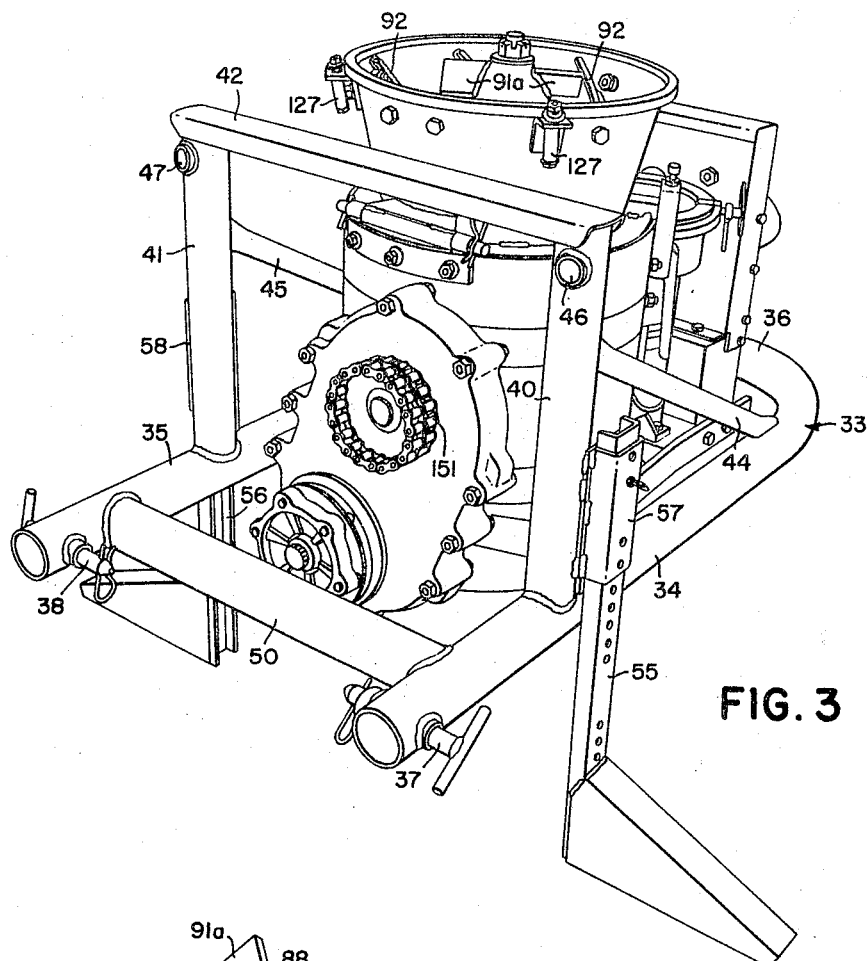
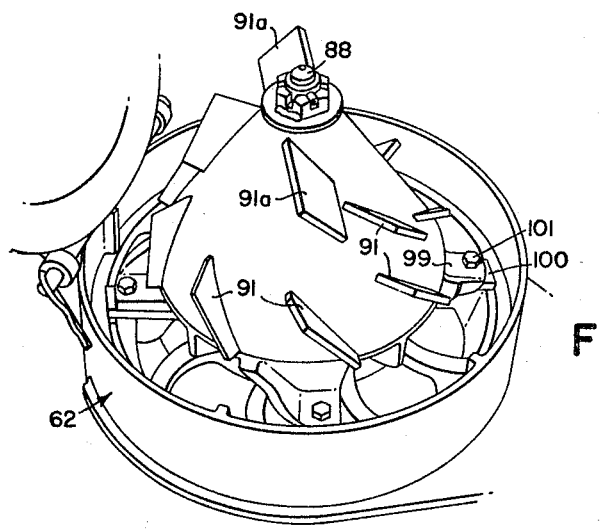

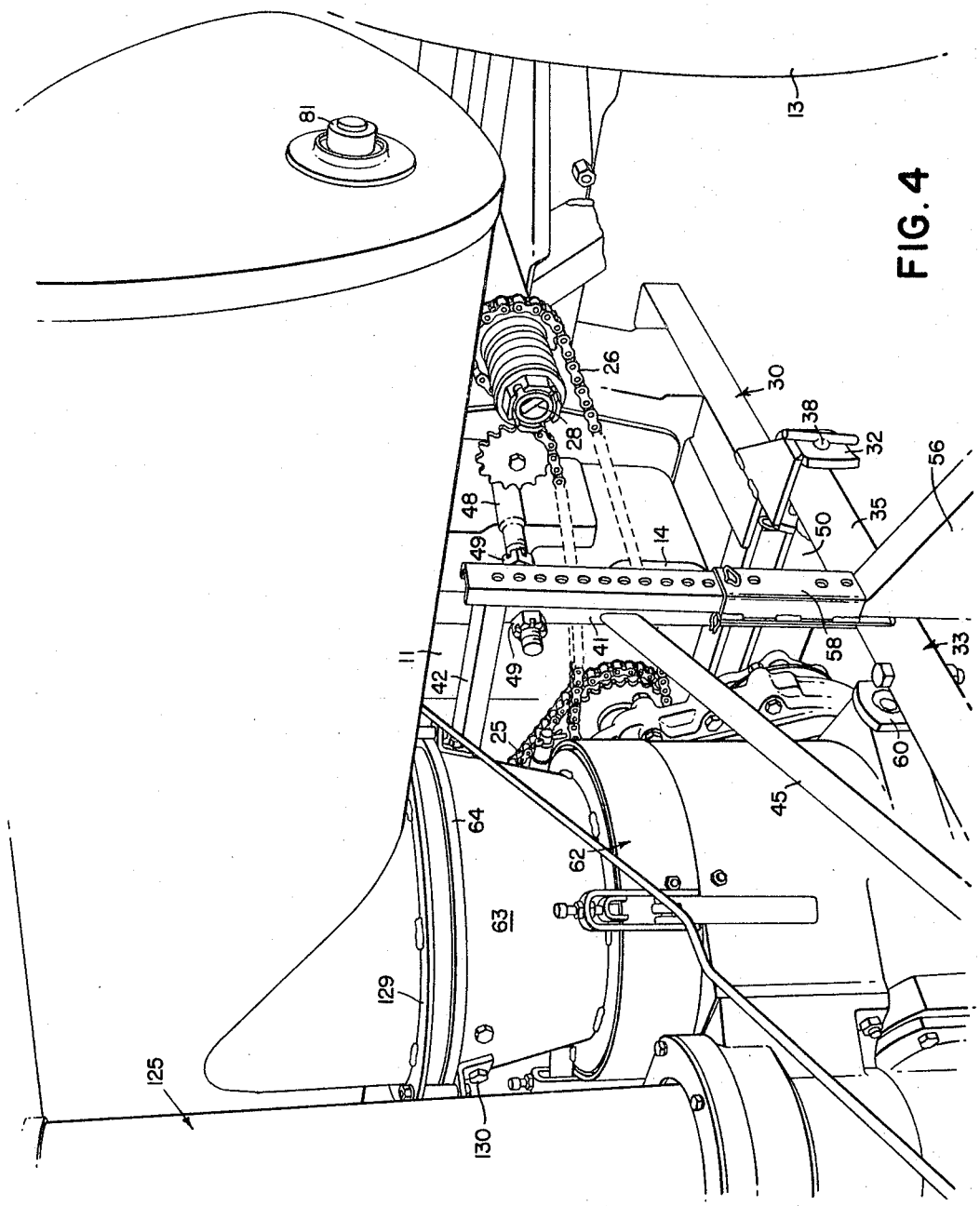

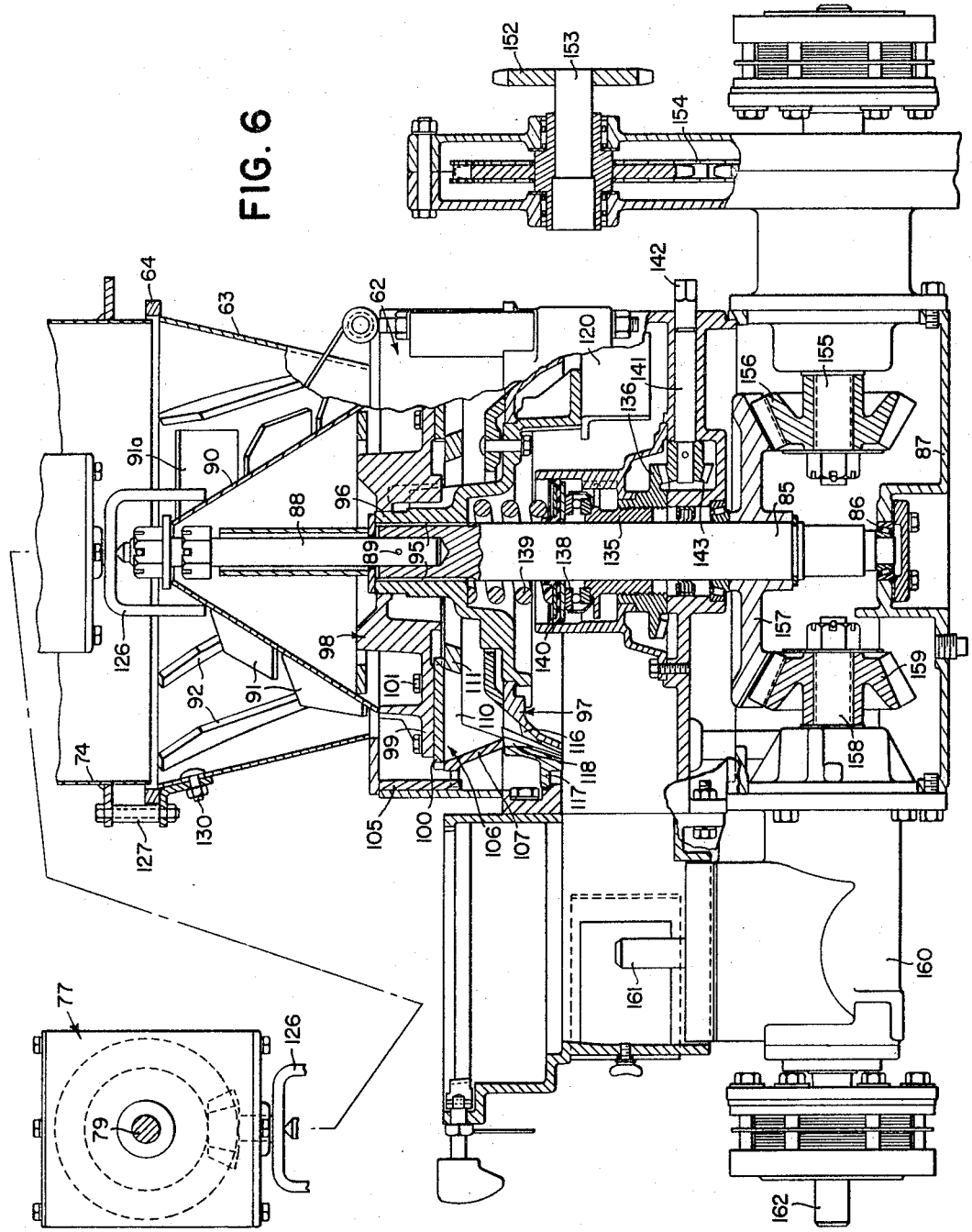

United States Patent Office 3,319,405
Patented May 16, 1967

3,319,405
AGRICULTURAL IMPLEMENT
Martin A. Berk, Horicon, Wis., assignor to Deere & Company, Moline, Ill., a corporation of Delaware
Filed June 5, 1964, Ser. No. 372,752
8 Claims. (Cl. 56—15)

This invention relates to an agricultural implement and more particularly to a row crop harvesting implement. Still more particularly this invention relates to a corn harvester normally supported on a tractor with harvesting units on opposite sides of the tractor body capable of harvesting rows of corn on opposite sides of the body. Still more particularly this invention relates to the combination of the corn harvester with a tractor mounted rear material reducing mill that receives the picked ears of corn from the row units and reduces it to mill size particles.

It is a primary object of the invention to provide a two row corn harvester with the harvesting units disposed forwardly of the rear traction wheels of a conventional type tractor and having transversely spaced discharge ends rearwardly of the traction wheels. Suspended rearwardly from the tractor body is a mill centrally located between the wheels and normally in fore-and-aft alignment with the tractor body. The mill opens upwardly and has a hopper type feeding arrangement with transversely spaced outer ends adapted to receive the picked corn or material from the transversely spaced harvesting units.

It is a further object of the present invention to provide with the mill a supporting frame having a rearwardly disposed implement hitch device adapted to have a trailing implement connected thereto.

It is a further object of the present invention to provide a power train for operating the mill operatively connected to the power source on the tractor and terminating in a power take-off shaft projecting rearwardly from the rear side of the mill.

It is still a further object of the invention to provide a new and novel type of burr mill in combination with the above-described structure adapted to break up the ears prior to the grinding operation and following grinding to feed the particles into a discharge auger.

It is still a further object of the present invention to provide a unique type of adjusting arrangement in the mill that moves the grinding plates toward and away from one another so as to adjust the coarseness of the milled material.

Other objects and advantages of the present invention will become apparent to those skilled in the art as the nature of the invention is better understood from the following description and as shown in the accompanying drawings.

FIG. 3 is a front and side perspective view of the mill proper.

FIG. 4 is a side and rear perspective view showing portions of the mill and the tractor body.

FIG. 6 is a vertical longitudinal sectional view taken through the center of the mill.

FIG. 9 is an overhead and side perspective view of the burr mill with the housing removed for purposes of showing internal mechanism.

Figure 1:
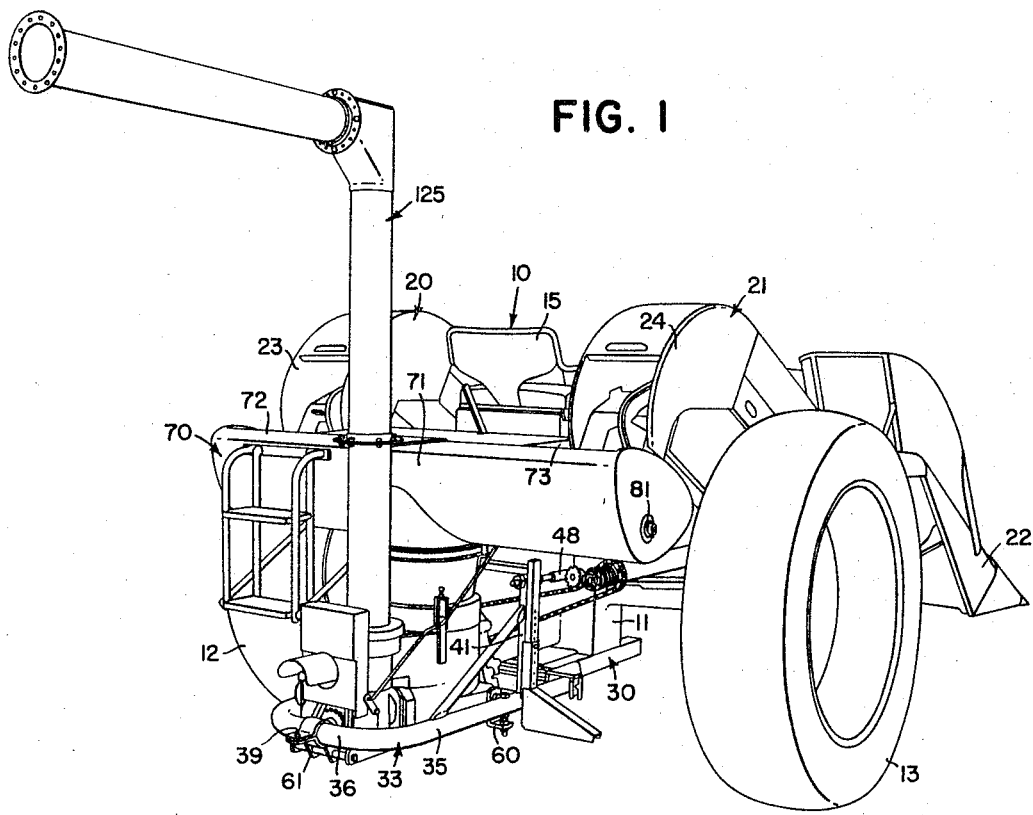
FIG. 1 is a rear and side perspective view of the entire harvesting implement and its supporting tractor.
Figures 7, 8:
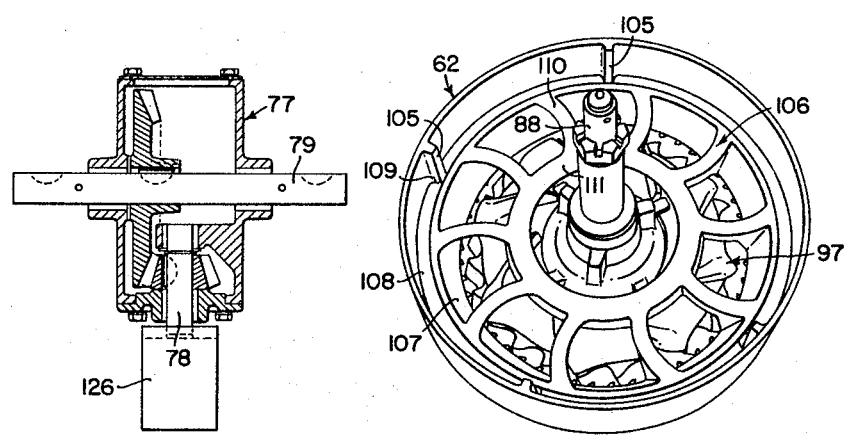
FIG. 7 is a sectional view taken substantially along the line 7—7 of FIG. 5.
FIG. 8 is an overhead perspective view of the burr mill with the upper portion thereof removed for purposes of showing internal mechanism.
Figure 2:
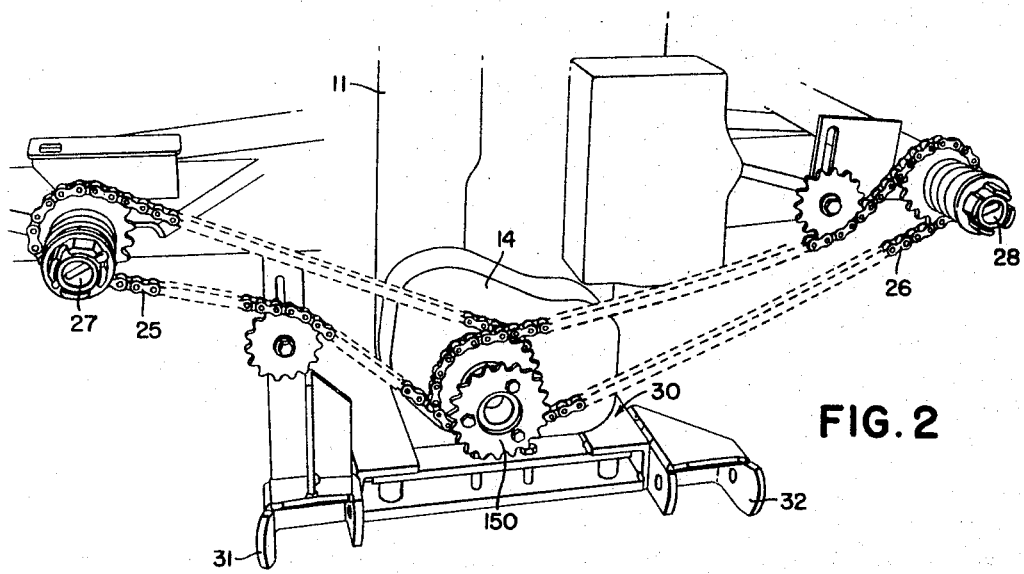
FIG. 2 is a rear perspective view of the tractor support and showing in representative lines a rear portion of the tractor body.
Figure 5:
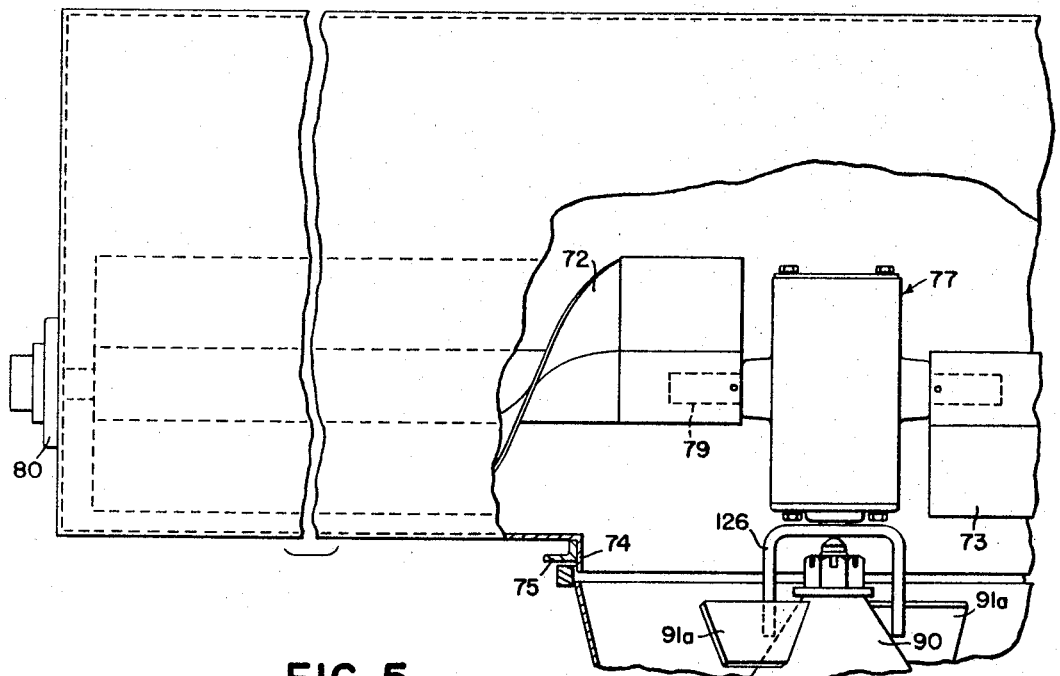
FIG. 5 is a rear view, with portions broken away, of one end of the auger feed mechanism leading into the mill.

The harvester herein to be described is of a multi-row type adapted for mounting on a tractor 10 having a tractor body 11 with rear traction wheels 12, 13. The tractor has a main power source, not shown, and a conventional type rearwardly projecting power take-off shaft extending into a gear housing 14 at the rear of the tractor body 11. An operator's station, as indicated by the seat 15, is provided on the tractor and is located for convenient operation and viewing by an operator of the entire harvesting operation. The traction wheels 12, 13 are spaced outwardly from the basic tractor body 11 sufficiently to provide spacing to receive left- and right-hand harvesting units 20, 21 in a manner so that the forward crop receiving portions thereof, as indicated at 22 on the right unit 21, are positioned forwardly of the traction wheels 12, 13 and transversely spaced rear discharge ends 23, 24 of the respective harvester row units 20, 21 are positioned rearwardly of the traction wheels 12, 13.

Power means for operating the harvesting mechanism and the row units 20, 21 is provided by chain drives 25, 26 extending from a suitable rearwardly projecting power shaft on the gear housing 14 to outer fore-and-aft extending left- and right-hand harvester power shafts 27, 28. The basic mounting framework for supporting the row units 20, 21 on the tractor body 11, as well as the basic drive mechanism to those units, is shown and described in U.S. Patent 2,700,262 that issued to Mr. Norman F. Andrews.

An attachment frame 30 is bolted or otherwise fixed to the underside of the rear portion of the tractor body 11 and has thereon a pair of transversely aligned and transversely spaced connecting yokes 31, 32. The yokes 31, 32 receive the forward ends of a horizontally disposed left leg 34 and a right leg 35 respectively of a U-shaped horizontal structure 33. The legs 34, 35 are interconnected by a bight portion 36 considerably rearwardly of the attachment frame 30. Pins 37, 38 extend through the forward ends of the legs 34, 35 and the respective connecting yokes 31, 32 and operate to connect the structure 33 to the attachment frame 30. The U-shaped structure 33 operates in part as a drawbar having an implement hitch 39 on the bight portion 36 for connecting a trailing implement to the tractor.

Vertical structural tubes 40, 41 have lower ends welded to the upper sides of the respective legs 34, 35 and have upper ends interconnected by a transverse channel 42. The tubes 40, 41 are further interconnected with the legs 34, 35 by trusses 44, 45 respectively. Adjacent the upper ends of the structural tubes 40, 41 is a pair of stud openings 46, 47 adapted to receive rearwardly projecting studs, one of which is shown at 48 (FIG. 4), mounted on the tractor body 11. Nuts 49 are provided on threaded portions of studs 48 and by suitable adjustment along the studs may vertically adjust the entire framework. The U-shaped structure 33 is further cross braced by a transverse tube 50 interconnecting the forward portions of the legs 34, 35.

A pair of ground supporting legs 55, 56 is telescopingly received in a pair of channels 57, 58 fixed to and extending outwardly from the sides of the vertical structural tubes 40, 41.

Suitable brackets, such as shown at 60, 61, are mounted on the U-shaped structure 33 and are connected for support of an upright burr mill housing, indicated in its entirety by the reference numeral 62. The bight portion 36 extends rearwardly of the housing 62 and the U-shaped structure circumscribes the entire burr mill assembly. The housing 62 has an upper frusto-conical portion 63 with an upper annular edge 64 defining a material receiving opening for the burr mill proper. As may be seen from viewing various of the figures, the mill housing 62 is aligned longitudinally with the tractor body 11 and centrally between the traction wheels 12, 13.

A material transferring device in the form of an auger assembly 70 is provided atop the burr mill housing 62 and has a pair of transversely spaced inlets 72, 73 at opposite ends of an auger trough 71 and directly beneath and for receiving the material moving downwardly from the discharge ends 23, 24 of the harvesting units 20, 21. The trough 71 has central discharge means in the form of a downwardly extending annular opening 74. An annular track 75 is fixed to the outer surface of the annular wall forming the opening 74 and may rest on the upper annular ring 64 of the housing 62. Consequently the opening 74 forms an upper continuation of the housing 62.

A pair of transversely aligned auger flightings 75, 76 is disposed within the auger housing 71 and operates to move material from the inlets 72, 73 to the central discharge means 74. Disposed between the inner ends of the auger flightings 75, 76 is a gear transmission, indicated in its entirety by the reference numeral 77, having a downwardly extending input shaft 78 and a horizontally disposed output shaft 79 extending to opposite sides of the transmission and having opposite ends thereof connected to the respective flightings 75, 76. The outer ends of the flightings 75, 76 are supported on journals 80, 81 respectively carried on the outer ends of the trough housing 71.

The rotor structure within the housing 62 is composed in part of a main upright drive shaft 85 journaled at 86 at its lower end on a housing floor plate 87. An upper extension 88 is provided on the shaft 85 and is pinned thereto at 89 to rotate therewith. Fixed to the extension 88 is an ear breaker device in the form of an upper conical-shaped plate 90 having radially extending lugs 91 on the face thereof. The plate 90 is radially inwardly offset from the frusto-conical portion 63 of the housing. The portion 63 has inwardly extending spiral-shaped lugs 92 extending from its inner face. The lugs 91, 92 interact to break up ears of corn passing into the burr mill.

Splined at 95 to the main shaft 85 is a hub 96 of a main burr plate 97. A cutter plate structure 98 is supported on and is fixed to rotate with the hub portion 96. The cutter plate structure 98 has radially outwardly projecting lugs 99 angularly spaced apart and carrying a series of angularly spaced cutting blades 100, bolts 101 being used to interconnect the lugs 99 and blades 100. A series of angularly spaced vertical lugs 105 is provided on the internal face of the housing 62. A fixed blade member 106 having an outer depending flange 107 and a laterally extending outer flange 108 is notched, at 109, to receive the lugs 105. The fixed blade is of the spider type having a series of radially extending blades 110 extending in spoke-like fashion from an inner annular ring 111 beneath the rotating blades 100. As material passes through the cutter blades 100, 106 it will pass adjacent the burr plate 97 and into an area of the burr teeth 116 on the plate 97. Offset outwardly and fixed to the wall of the housing 62 is a fixed burr plate 117 having teeth 118 that cooperate with the teeth 116 on the rotating plate 97 to grind the material ino fine particles. The cooperating portions of the burr mill plates 97, 117 are generally conical shaped.

Fixed to the lower extremities of the rotating burr plate 97 is a series of depending paddles or impeller blades 120 that receives the material passing through the material reducing area of the burr mill and drives it rearwardly to the lower end of a vertical discharge auger or conveyor mechanism, indicated in its entirety by the reference numeral 125.

Referring again to the input shaft 78 for the auger transmission 77, there is provided on the lower end thereof a U-shaped coupler element 126 having vertically disposed depending leg portions that engage upper lugs 91a of the ear breaking lugs 91 on the conical-shaped plate 90. Consequently as the main shaft 85 is rotated it will also cause the augers 75, 76 to rotate. Also, there is provided for coupling the housing portions 74 and 63 together a series of angularly spaced lock devices 127 that retain the discharge opening 74 and the material intake opening defined by the annular ring 64 in registry with one another so that material will pass directly into the burr mill. Also, as will become apparent the placing in registry of the two openings also forces the coupler 126 into operable engagement with the main shaft 85 via the lugs 91a. The locks 127 cooperate with outwardly projecting annular rings 128 on the outer face of the wall forming the opening 74 to hold the entire auger assembly on the mill housing 63. The locks 127 are bolted at 130 to the housing portion 63.

As previously mentioned the burr plates 97, 117 are conical-shaped. Consequently vertical movement of the burr plate 97 will effect adjustment of the teeth 116 toward or away from the teeth 118. Such adjustment is provided by a collar 135 supported on the shaft 85 for axial movement and having a threaded outer surface supported on the housing 62 through the incidence of a bevel gear 136 having its hub portion threaded to the outer surface of the adjusting collar 135. The collar 135 bears against a thrust bearing 138 bearing against the lower end of a spring 139, and the latter bearing against the underside of the burr plate 97. Suitable packing 140 is provided between the thrust bearing 138 and the lower end of the spring 139. The collar 135 is moved axially by a control element or rod 141, horizontally disposed and having an outer end 142 external of the housing 62. The internal end of the rod 141 carries a bevel gear 143 meshing with the gear 136. The external end 142 is squared off for purposes of receiving a wrench so that manual turning of the gears 143, 136 may occur.

Power is transmitted from the main power source of the tractor through a sprocket 150 carried on the shaft extending from the gear housing 14. The sprocket 150 forms one sprocket of a flexible-type chain coupling 151 that drives the sprocket 152 carried on a countershaft 153 on the burr mill. The shaft 153 drives through a suitable chain drive 154, a lower horizontally disposed drive shaft 155 drivingly connected through bevel gears 156, 157 to the lower end of the main shaft 85. The bevel gear 157 also drives a rearwardly projecting horizontal shaft 158 through a bevel gear 159. A suitable bevel gear transmission, indicated only by its transmission housing 160, is provided for the shaft 158 to drivingly connect the shaft 158 to the lower end of a vertical shaft 161 adapted for connection to the lower end of the auger contained in the auger discharge conveyor 125. The bevel gear transmission also drivingly interconnects the shaft 158 with a rear power take-off shaft 162 projecting rearwardly and adapted for connection to the operating mechanism of a trailing vehicle.

In operation, the entire unit is more or less self-contained in that it will be used primarily for the purpose of picking and reducing ears of corn. The harvesting units 20, 21 harvest the corn in ears and discharge the ears of corn into the transverse conveyor 70 to be transferred inwardly to the upper portion of the burr mill. The burr mill grinds, pulverizes, and generally comminutes the ears of corn into a rather fine material to be discharged through the discharge conveyor 125 into a trailing vehicle. If it is necessary to discharge the material from the trailing vehicle by a floor conveyor, beater, or other type of mechanism requiring power from the tractor, such may be had by connecting the implement drive devices to the power take-off shaft 162. In many instances, it might be desirable, for example to reduce the material into sizes desired to be fed directly into a feed trough.

Consequently the material may be discharged through the conveyor 125 directly into a self-unloading type of wagon with a side discharge and the entire harvester, tractor, and trailing vehicle may be utilized for directly feeding the material into the trough. All of this may be done without disconnecting or dismounting any of the particular implements or vehicles involved.

While only one form of the invention has been shown, it should be recognized that other forms and variations of the invention will occur to those skilled in the art. Therefore, while the preferred form is shown and described in concise and detailed manner for the purpose of clearly illustrating the principles of the invention, it is not the intention to limit or narrow the invention beyond the broad concepts set forth in the appended claims.

What is claimed is:

1. A multi-row crop harvester adapted for mounting on a tractor having a longitudinal body, a pair of traction wheels outwardly of the body, and a power source, the harvester comprising: row crop harvesting means supported on the tractor body adapted to harvest rows of crop on opposite sides of the tractor body and having forward material intake ends forwardly of the traction wheels and a pair of transversely spaced crop discharge ends rearwardly of the wheels for discharging downwardly the harvested corps; a mill longitudinally aligned rearwardly with the tractor body having a material receiving opening beneath and offset inwardly from the discharge ends; a material transferring device including a transverse auger housing supported on the mill with a pair of transversely spaced inlets beneath and for receiving material from the respective discharge ends, the housing further having a central discharge means opening into the mill, and a pair of transversely aligned auger flightings within the auger housing for moving material from the inlets to the discharge means; a U-shaped horizontally disposed suspension frame adapted to be suspended rearwardly of the tractor body and having foreand-aft extending leg portions on opposite sides of the mill and a rear bight portion behind the mill; and implement hitch on the bight portion for connecting a trailing implement; means on the frame for supporting the mill; and a power train on the mill for operating the mill and adapted to be operatively connected to the power source, the power train including a power take-off shaft extending rearwardly of the mill and adapted for connection to a drive means on a trailing implement.

2. A multi-row crop harvester adapted for mounting on a tractor having a longitudinal body, a pair of traction wheels outwardly of the body, and a power source, the harvester comprising: row crop harvesting means supported on the tractor body adapted to harvest rows of crop on opposite sides of the tractor body and having forward material intake ends forwardly of the traction wheels and a pair of transversely spaced crop discharge ends rearwardly of the wheels for discharging downwardly the harvested crops; a mill longitudinally aligned rearwardly with and suspended on the tractor body having an upper material receiving opening beneath and offset inwardly from the discharge ends, the mill being adapted to comminute and pulverize material as it moves from the receiving opening downwardly to a lower discharge area, and the mill further having a discharge conveyor for moving the comminuted and pulverized material from the discharge area; a material transferring device including a transverse auger housing supported on the mill with a pair of transversely spaced inlets beneath and for receiving material from the respective discharge ends, the housing further having a central discharge means opening into the mill, and a pair of transversely aligned auger flightings within the auger housing for moving material from the inlets to the discharge means; an implement hitch on the rear side of the mill for connecting a trailing implement; and a power train on the mill for operating the mill and adapted to be operatively connected to the power source, the power train including a power take-off shaft extending rearwardly of the mill and adapted for connection to a drive means on a trailing implement.

3. A multi-row crop harvester adapted for mounting on a tractor having a longitudinal body, a pair of traction wheels outwardly of the body, and a power source, the harvester comprising: row crop harvesting means supported on the tractor body adapted to harvest rows of crop on opposite sides of the tractor body and having forward material intake ends forwardly of the traction wheels and a pair of transversely spaced crop discharge ends rearwardly of the wheels for discharging downwardly the harvested crops; a mill longitudinally aligned rearwardly with and suspended on the tractor body having an upper material receiving opening beneath and offset inwardly from the discharge ends, the mill being adapted to comminute and pulverize material as it moves from the receiving opening downwardly to a lower discharge area, and the mill further having a discharge conveyor for moving the comminuted and pulverized material from the discharge area; a material transferring device including a transverse housing supported on the mill with a pair of transversely spaced inlets beneath and for receiving material from the respective discharge ends, the housing further having a central discharge means opening into the mill, and a pair of transverse conveyors within the housing for moving material from the inlets to the discharge means; an implement hitch on the rear side of the mill for connecting a trailing implement; and a power train on the mill for operating the mill and adapted to be operatively connected to the power source, the power train including a power take-off shaft extending rearwardly of the mill and adapted for connection to a drive means on a trailing implement.

4. A multi-row crop harvester adapted for mounting on a tractor having a longitudinal body, a pair of traction wheels outwardly of the body, and a power source, the harvester comprising: row crop harvesting means supported on the tractor body adapted to harvest rows of crop on opposite sides of the tractor body and having forward material intake ends forwardly of the traction wheels and a pair of transversely spaced crop discharge ends rearwardly of the wheels for discharging downwardly the harvested crops; a mill longitudinally aligned rearwardly with and suspended on the tractor body having an upper material receiving opening beneath and offset inwardly from the discharge ends, the mill being adapted to comminute and pulverize material as it moves from the receiving opening downwardly to a lower discharge area, and the mill further having a discharge conveyor for moving the comminuted and pulverized material from the discharge area; a material transferring device beneath and for receiving material from the respective discharge ends having a central discharge means opening into the upper opening of the mill; an implement hitch on the rear side of the mill for connecting a trailing implement; and a power train on the mill for operating the mill and adapted to be operatively connected to the power source, the power train including a power take-off shaft extending rearwardly of the mill and adapted for connection to a drive means on a trailing implement.

5. A multi-row crop harvester adapted for mounting on a tractor having a longitudinal body, a pair of traction wheels outwardly of the body, and a power source, the harvester comprising: row crop harvesting means supported on the tractor body adapted to harvest rows of crop on opposite sides of the tractor body and having forward material intake ends forwardly of the traction wheels and a pair of transversely spaced crop discharge ends rearwardly of the wheels for discharging downwardly the harvested crops; a mill longitudinally aligned rearwardly with and suspended on the tractor body having an upper material receiving opening beneath and offset inwardly from the discharge ends, the mill being adapted to comminute and pulverize material as it moves from the receiving opening downwardly to a lower discharge area, and the mill further having a discharge conveyor for moving the comminuted and pulverized material from the discharge area; and a material transferring device beneath and for receiving material from the respective discharge ends having a central discharge means opening into the upper opening of the mill.

6. A multi-row crop harvester adapted for mounting on a tractor having a longitudinal body, a main frame including a pair of traction wheels outwardly of the body, and a power source, the harvester comprising: row crop harvesting means supported on the tractor body adapted to harvest rows of crop on opposite sides of the tractor body and having forward material intake ends forwardly of the traction wheels and a pair of transversely spaced crop discharge ends rearwardly of the wheels for discharging downwardly the harvested crops; an upright mill housing longitudinally aligned rearwardly with and suspended on the tractor body centrally of the traction wheels and having an upper material receiving opening beneath and offset inwardly from the discharge ends; a material transferring device including a transverse auger housing supported on the mill with a pair of transversely spaced inlets beneath and for receiving material from the discharge ends, the housing further having a central discharge means opening into the mill; a pair of transversely aligned auger flightings within the auger housing having adjacent inner ends for moving material from the inlets to the discharge means; an upright rotatable shaft in the mill housing; radially extending and vertically spaced mill plates alternately supported on the mill housing and shaft and having interworking element means adapted to comminute and pulverize material gravitating through the mill housing upon the shaft being rotated; a drive means extending between the upper of the plates on the shaft and the inner ends of the auger flightings; an implement hitch on the rear side of the mill housing for connecting a trailing implement; and a power train on the mill housing adapted to be operatively connected to the power source and including drive means to the lower end of the vertical shaft, the power train further including a power take-off shaft extending rearwardly of the mill and adapted for connection to a drive means on a trailing implement.

7. A multi-row crop harvester adapted for mounting on a tractor having a longitudinal body, a main frame including a pair of traction wheels outwardly of the body, and a power source, the harvester comprising: row crop harvesting means supported on the tractor body adapted to harvest rows of crop on opposite sides of the tractor body and having forward material intake ends forwardly of the traction wheels and a pair of transversely spaced crop discharge ends rearwardly of the wheels for discharging downwardly the harvested crops; an upright mill housing longitudinally aligned rearwardly with and suspended on the tractor body centrally of the traction wheels and having an upper material receiving opening beneath and offset inwardly from the discharge ends; a material transferring device including a transverse auger housing supported on the mill with a pair of transversely spaced inlets beneath and for receiving material from the discharge ends, the housing further having a central discharge means opening into the mill; a pair of transversely aligned auger flightings within the auger housing having adjacent inner ends for moving material from the inlets to the discharge means; an upright rotatable shaft in the mill housing; radially extending and vertically spaced mill plates supported on the mill housing and shaft and having interworking element means adapted to comminute and pulverize material gravitating through the mill housing upon the shaft being rotated; a drive means extending between the upper of the plates on the shaft and the inner ends of the auger flightings; and a power train on the mill housing adapted to be operatively connected to the power source and including drive means to the lower end of the vertical shaft.

8. A multi-row crop harvester adapted for mounting on a tractor having a longitudinal body, a main frame including a pair of traction wheels outwardly of the body, and a power source, the harvester comprising: harvesting means supported on the tractor body having a pair of transversely spaced crop discharge ends rearwardly of the wheels for discharging downwardly the harvested crops; an upright mill housing longitudinally aligned rearwardly with and suspended on the tractor body centrally of the traction wheels and having an upper material receiving opening beneath and offset inwardly from the discharge ends; a material transferring device including a transverse auger housing supported on the mill with a pair of transversely spaced inlets beneath and for receiving material from the discharge ends, the housing further having a central discharge means opening into the mill; a pair of transversely aligned auger flightings within the auger housing having adjacent inner ends for moving material from the inlets to the discharge means; a power transmission between and drivingly connected to the inner ends with a downwardly extending power input shaft; an upright rotatable shaft in the mill housing; radially extending and vertically spaced mill plates supported on the mill housing and shaft and having interworking element means adapted to comminute and pulverize material gravitating through the mill housing upon said rotatable shaft being rotated; a drive coupler on the lower end of the input shaft adapted for operable connection with the upper end of the rotatable shaft; a coupling between the auger housing and mill housing for placing in registry the discharge means and material receiving opening and for placing the drive coupler in connection with the drive shaft; and a power train on the mill housing adapted to be operatively connected to the power source and including drive means to the lower end of the vertical drive shaft.

References Cited by the Examiner

UNITED STATES PATENTS

| | | | |
|---|---|---|---|
| 1,925,975 | 9/1933 | Benner | 56—15 |
| 2,833,287 | 5/1958 | Sammarco et al. | 56—18 X |
| 2,957,293 | 10/1960 | Roscoe et al. | 56—18 |
| 3,126,688 | 3/1964 | Karlsson | 56—18 |
| 3,133,397 | 5/1964 | Halls | 56—25 |

ABRAHAM G. STONE, *Primary Examiner.*

A. F. GUIDA, *Assistant Examiner.*